US012671590B2

(12) United States Patent
Aidan

(10) Patent No.: US 12,671,590 B2
(45) Date of Patent: Jun. 30, 2026

(54) AUTHENTICATION BASED ON MAKEUP APPLICATION TECHNIQUE

(71) Applicant: ELC MANAGEMENT LLC, Melville, NY (US)

(72) Inventor: Christopher Aidan, Austin, TX (US)

(73) Assignee: ELC MANAGEMENT LLC, Melville, NY (US)

( * ) Notice: Subject to any disclaimer, the term of this patent is extended or adjusted under 35 U.S.C. 154(b) by 178 days.

(21) Appl. No.: 18/428,751

(22) Filed: Jan. 31, 2024

(65) Prior Publication Data

US 2025/0247241 A1 Jul. 31, 2025

(51) Int. Cl.
| | |
|---|---|
| *H04L 9/32* | (2006.01) |
| *G06F 21/32* | (2013.01) |
| *H04L 9/40* | (2022.01) |

(52) U.S. Cl.
CPC ............ *H04L 9/3231* (2013.01); *G06F 21/32* (2013.01); *H04L 63/0861* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 11,138,301 | B1 * | 10/2021 | Castañeda ............ | G06V 40/197 |
| 2011/0300829 | A1 * | 12/2011 | Nurmi ................... | H04L 9/3231 |
| | | | | 455/411 |

OTHER PUBLICATIONS

Chen, "Spoofing Faces Using Makeup: An Investigative Study", 2017 IEEE International Conference on Identity Security and Behavior Analysis (ISBA), pp. 1-8. (Year: 2017).*
Killian, "The Role of Regional Contrast Changes and Asymmetry in Facial Attractiveness Related to Cosmetic Use", Frontiers in Psychology, vol. 9, Dec. 2018, pp. 1-11. (Year: 2018).*
Li, "Cosmetic-Aware Makeup Cleanser", 10th IEEE International Conference on Biometrics: Theory, Applications and Systems, 2019, pp. 1-7. (Year: 2019).*
Rathgeb, "Impact and Detection of Facial Beautification in Face Recognition: An Overview", IEEE Access vol. 7, Oct. 2019, pp. 1-12. (Year: 2019).*

* cited by examiner

*Primary Examiner* — Benjamin E Lanier
(74) *Attorney, Agent, or Firm* — MARSHALL, GERSTEIN & BORUN LLP

(57) ABSTRACT

Techniques are disclosed for authenticating a person based on the person's individual makeup application techniques (MATs) for secured access purposes. As combinations of MATs are highly individualized and may even be unique between different people, the disclosed techniques leverage MAT signatures as an authentication factor. For example, various makeup application technique footprints produced by corresponding MATs which were utilized to apply makeup to a subject person may be extracted from a captured image in which the subject person is depicted. One or more combinations of the extracted footprints may be compared to a MAT signature registry to thereby authorize the identity of the subject person or otherwise deny authorization of the subject person. MAT-based authentication may be combined with other authentication factors (such as biometric identification techniques) to provide increased levels of security.

18 Claims, 3 Drawing Sheets

300

302 — Obtain A Plurality Of Images Of A Subject Person

305 — Extract Respective MAT Footprints From Each Image

308 — Discover One Or More Combinations Of Extracted MAT Footprints That Occur More Frequently Than Other Combinations 310 — Select One Of The Discovered Combinations To Be A MAT Signature Of The Subject Person 312 — Store MAT Signature Into MAT Signature Registry

300

302 — Obtain A Plurality Of Images Of A Subject Person

305 — Extract Respective MAT Footprints From Each Image

308 — Discover One Or More Combinations Of Extracted MAT Footprints That Occur More Frequently Than Other Combinations 310 — Select One Of The Discovered Combinations To Be A MAT Signature Of The Subject Person 312 — Store MAT Signature Into MAT Signature Registry

AUTHENTICATION BASED ON MAKEUP APPLICATION TECHNIQUE

TECHNICAL FIELD

The present disclosure relates generally to systems and methods for authenticating a person or an identity of a person, and in particular, for authenticating the person based on makeup application techniques.

BACKGROUND

Authentication systems play a critical role in ensuring security and privacy in various applications, ranging from mobile devices to online services. Conventional techniques for authenticating a person or an identity of a person include passwords, personal identification numbers (PINs), and biometric-based systems (e.g., fingerprint, face, or iris recognition). However, these conventional techniques have their limitations, such as being susceptible to hacking, forgery, or spoofing. Thus, there is a need for a novel authentication technique that addresses these limitations and provides a more secure and user-friendly solution.

SUMMARY

Techniques, systems, apparatuses, components, devices, and methods are disclosed for authenticating a person or an identity of a person based on the person's individual makeup application technique (or combination thereof) for secured access purposes, e.g., to securely access mobile devices, applications, services, physical locations or spaces, virtual locations or spaces, etc. That is, the techniques, systems, apparatuses, components, devices, and methods disclosed herein may utilize the person's individual makeup application technique or combination of techniques as an authentication factor. A "makeup application technique" or "MAT," as utilized interchangeably herein, generally refers to how and/or in what pattern a person applies their personal makeup, for example, the set of individual makeup application techniques the person utilizes, the tools which a person utilizes to apply their makeup, the order in which different makeup products are applied, the particular regions of the face and/or body to which the person applies various types of makeup, combinations thereof, etc. Generally speaking, different people utilize different combinations of application techniques to apply makeup to themselves and, typically, each time (or a majority of the times) a person applies makeup to their face and/or body, the person utilizes a similar set, combination, and/or pattern of different makeup application techniques. Each makeup application technique may leave a respective makeup application technique footprint (also interchangeably referred to herein as a "makeup application technique fingerprint") on the person's face and/or body. For example, the blush application techniques utilized by Person A may include Person A applying blush after applying foundation but before applying eye makeup, utilizing a round brush and fingers to apply the blush on certain areas of the face and chest, utilizing the round brush in downward circles on certain areas of the face and chest and in dabs on other areas, and utilizing a generally similar pattern of finger pressures for each stroke, each of which produces or generates a respective makeup application footprint or fingerprint on Person A's face or body, which may subsequently be depicted in images of Person A. Accordingly, each makeup application technique footprint or fingerprint may be indicative of a particular makeup application technique that produced or generated the footprint or fingerprint. Further, makeup application technique footprints or fingerprints are not limited to only those caused by applying makeup by using human feet or with human fingers. Rather, the terms "makeup application technique footprints" and "makeup application technique fingerprints" as utilized herein may generally refer to makeup application techniques in which any type of makeup tool or implement is used to apply makeup. Accordingly, such makeup application technique footprints or fingerprints are referred to interchangeably herein as a "makeup application footprint," a "technique footprint," an "application footprint," or simply a "footprint." Thus, as a person typically utilizes a similar set of makeup application techniques each time the person applies their makeup (or applies their makeup for a particular look), the respective footprints of the set of makeup application techniques utilized by the person may collectively (or as a whole) form a makeup application technique signature of the person. Makeup application technique signatures can be highly individualized and in some cases can even be unique to a respective person. Accordingly, and advantageously, the techniques, systems, apparatuses, components, devices, and methods disclosed herein leverage makeup application technique signatures to authenticate people and/or to verify people's respective identities, as is explained in more detail elsewhere within this disclosure.

In an embodiment, a method of authenticating a person based on makeup application techniques may include capturing, by utilizing an image capturing device, an image of the person; and extracting, from the captured image, a plurality of footprints, where each footprint of the plurality of extracted footprints may be indicative of a respective technique via which make-up was applied to the person. The method may additionally include determining whether a respective distance between the plurality of extracted footprints and each makeup application technique (MAT) signature of a plurality of makeup application technique signatures is less than a threshold distance, where each MAT signature of the plurality of MAT signatures corresponds to a respective person and is indicative of a respective combination of techniques via which the respective person applies makeup. When none of the respective distances is less than the threshold distance, the method may include indicating, via least one of a display or a communication interface, that an authentication of the person failed. When one or more of the respective distances is less than the threshold distance, the method may include selecting a MAT signature corresponding to a least distance among the one or more respective distances, and authenticating the person captured in the image as the respective person corresponding to the selected MAT signature.

In an embodiment, a system for authenticating a person based on makeup application techniques may include one or more processors and a plurality of makeup application technique (MAT) signatures stored in one or more data stores of the system. Each makeup application technique signature of the plurality makeup application technique signatures may correspond to a respective person and be indicative of a respective combination of techniques via which the respective person applies makeup. The system may further include one or more non-transitory computer-readable media that are coupled to the one or more processors and that store instructions thereon. When the stored instructions are executed by the one or more processors, the system may be caused to capture, via an image capturing device, an image of the person, and extract, from the captured image, a plurality of makeup application technique footprints, where each footprint of the plurality of extracted footprints is indicative of a respective technique via which make-up was applied to the person. The system may be further caused to determine whether a respective distance between the plurality of extracted footprints (e.g., as a whole or in combination) and the each MAT signature of the plurality of MAT signatures is less than a threshold distance. When none of the respective distances is less than the threshold distance, the system may indicate, via least one of a display or a communication interface, that an authentication of the person failed. When one or more of the respective distances is less than the threshold distance, the system may select a MAT signature corresponding to a least distance among the one or more respective distances, and authenticate the person captured in the image as the respective person corresponding to the selected MAT signature.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof.

Figure 1:
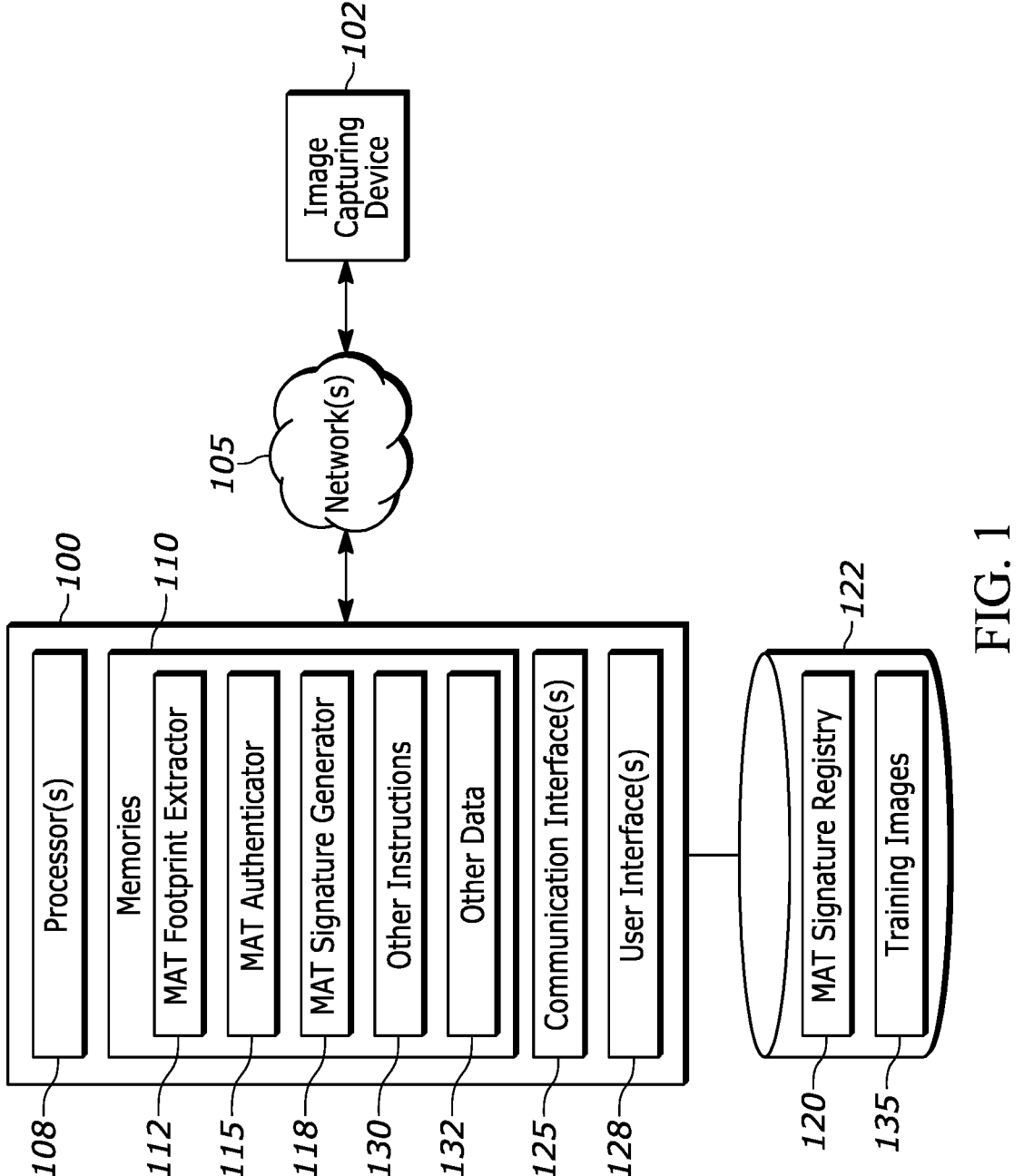
FIG. 1 depicts an example system for authenticating a person based on makeup application techniques.

While the systems and methods disclosed herein are susceptible of being embodied in many different forms, it is shown in the drawings and will be described herein in detail specific exemplary embodiments thereof, with the understanding that the present disclosure is to be considered as an exemplification of the principles of the systems and methods disclosed herein and is not intended to limit the systems and methods disclosed herein to the specific embodiments illustrated. In this respect, before explaining at least one embodiment consistent with the present systems and methods disclosed herein in detail, it is to be understood that the systems and methods disclosed herein is not limited in its application to the details of construction and to the arrangements of components set forth above and below, illustrated in the drawings, or as described in the examples. Methods and apparatuses consistent with the systems and methods disclosed herein are capable of other embodiments and of being practiced and carried out in various ways. Also, it is to be understood that the phraseology and terminology employed herein, as well as the abstract included below, are for the purposes of description and should not be regarded as limiting.

DETAILED DESCRIPTION

FIG. 1 depicts an example system 100 for authenticating people or the identities of people based on makeup application techniques (MATs), according to embodiments. Accordingly, the system 100 may be interchangeably referred to herein as the "MAT system 100." The MAT system 100 may include or may be communicatively connected to an image-capturing device 102. For example, in some embodiments (not depicted in FIG. 1), the image capturing device 102 is included in the system 100. In the example shown in FIG. 1, though, the system 100 and the image-capturing device 102 are communicatively connected or coupled via one or more networks 105. The one or more networks 105 may be a single communication link directly connecting the system 100 and the image-capturing device 102 (e.g., a direct wireless link), or one or more networks 105 may include multiple links and/or communication networks of one or more types (e.g., one or more wired and/or wireless local area networks (LANs), and/or one or more wired and/or wireless wide area networks (WANs) such as the Internet, public networks, private networks, etc.). For ease of reading herein (and not for limitation purposes), the one or more networks 105 may be referred to using the singular tense.

The image-capturing device 102 may be, for example, a camera, a smartphone, a smart device, a tablet, a laptop, a phablet, a wearable computing device, another type of personal computing device, a smart glass device, a smart watch device, an augmented reality device, a virtual reality device, a surveillance or security camera, or any device or system that includes one or more image sensors or other suitable image-capturing components. In some implementations, the image-capturing device 102 may include multiple devices which operate as a single, logical image-capturing device 102. For example, an image capturing system 102 may include multiple two-dimensional cameras whose outputs are combined to generate a three-dimensional image. For ease of reading herein, the image-capturing device 102 is referred to herein using the singular tense; however it is understood that the image-capturing device 102 may include multiple devices in embodiments. Further, the image-capturing device 102 can be configured to capture static images, dynamic images (such as videos), two-dimensional images, and/or three-dimensional images. In some embodiments, the image-capturing device 102 may include a personal electronic device (PED) of a person who desires to be authenticated or desires to have the person's identity authenticated. In these embodiments, the PED of the person may be a smart phone, a smart device, a web cam, or another type of PED that is being carried, ported, or otherwise utilized by the person.

The MAT system 100 may include one or more remote and/or local servers, a group (e.g., cluster or cloud) of multiple servers, and/or one or more other suitable types of computing devices or systems. In some embodiments, the system 100 includes a personal electronic device (PED) of a person who desires to be authenticated or desires to have the person's identity authenticated. In these embodiments, the PED of the person may be a smart phone, a smart device, a web cam, or another type of PED that is being carried, ported, or otherwise utilized by the person.

At any rate, whether the MAT system 100 includes a PED of a person, one or more servers, and/or one or more computing devices and/or systems, the system 100 generally includes one or more processors 108, which may or may not be distributed among a plurality of computing servers, devices, and/or systems of which the MAT system 100 comprises. The one or more processors 108 may include any suitable number of processors and/or processor types (e.g., one or more central processing units (CPUs)); however, the one or more processors 108 may be referred to herein using the singular tense for ease of reading (and not limitation) purposes. Generally, processor 108 is configured to execute software and/or other types of computer-executable instructions that are stored in one or more persistent memories 110 of system 100 and that particularly configure the system 100 authenticate people based on makeup application techniques, e.g., based on footprints of makeup application techniques which were utilized to apply makeup to the person.

As shown in FIG. 1, the MAT system 100 includes one or more persistent memories 110. The one or more persistent memories 110 may be tangible, non-transitory memories and may include Random Access Memories (RAMs), Read-Only Memories (ROMs), flash memory, hard drives, solid state memories, data banks, cloud data storage, and/or other types of persistent memories. In some implementations, the persistent memories 110 may include one or more persistent memories that are located remotely from the system 100 (e.g., remote data banks, etc.). The one or more persistent memories 110 may or may not be distributed among a plurality of computer services, data storage devices, and/or systems of which the MAT system 100 comprises. For ease of reading herein and not for limitation purposes the one or more memories 110 of the MAT system 100 may be referred to herein using the singular tense.

The MAT system 100 may include one or more sets of computer-executable instructions 112, 115, 118 that are stored on memory 110 and executable by processor 108. As depicted in FIG. 1, the system 100 includes a MAT footprint extractor 112, a MAT authenticator 115, and a MAT signature generator 118. Generally, and as is described in more detail herein, the MAT footprint extractor 112 operates on images captured by the image capturing device 102 to extract makeup authentication technique footprints, the MAT authenticator 115 authenticates people depicted within the captured images (e.g., as per block 202 of FIG. 2) based on the extracted makeup application technique footprints and a makeup application technique signature registry 120, and the MAT signature generator 118 generates, creates, updates, and/or modifies one or more MAT signatures stored in the registry 120.

The MAT system 100 may include a MAT signature registry 120 which may be stored in a data store 122. Data store 122 may be implemented using one or more data storage devices and/or systems, such as local and/or remote data storage devices, data banks, distributed data storage systems, data clouds, etc. In some embodiments of the system 100, at least a portion of data store 122 may be included in the system 100 (e.g., in the memory 110 or otherwise), and/or at least a portion of the data store 122 may be communicatively connected to the system 100 (e.g., via network 105).

The MAT signature registry 120 may include a plurality of MAT signatures of a plurality of different people. Each of the plurality of MAT signatures stored in the registry 120 may correspond to a respective person and, as previously discussed, may be indicative of or otherwise correspond to a respective set of MAT footprints indicative of a respective group of makeup application techniques utilized by the respective person to apply his, her, or their makeup. In some situations, multiple MAT signatures within the registry 120 may correspond to the same person. For example, each MAT signature of a particular person may correspond to a different makeup look applied by the person (e.g., an everyday makeup look, a summer makeup look, a winter makeup look, a formal makeup look, an on-camera makeup look, etc.). At least some of the MAT signatures within the registry 120 may have been generated by the system 100 (e.g., in manners such as discussed elsewhere within this disclosure), and/or at least some of the MAT signatures within the registry 120 may have been generated by and received from another system and stored in the data store 122. If desired, at least some of the MAT signatures included in the MAT signature registry 120 may have been respectively approved, authorized, or registered, e.g., by the person associated with the respective MAT signature. In some implementations, only approved MAT signatures are included in the MAT signature registry 120.

The MAT system 100 may include one or more communication interfaces 125, which may include, for example, one or more wireless interfaces configured to support one or more wireless communications and/or data protocols (e.g., via respective transceivers) and/or one or more wired interfaces configured to support one or more wired communications and/or data protocols (e.g., via respective transceivers). For example, system 100 may communicatively connect to the network 105 and/or directly to the image-capturing device 102 via the one or more communication interfaces 125. The one or more communication interfaces 125 may include one or more wireless interfaces that are configured to transmit and receive data using a Bluetooth protocol, a Wi-Fi (IEEE 802.11 standard) protocol, a near-field communication (NFC) protocol, a cellular (e.g., GSM, CDMA, LTE, WiMAX, etc.) protocol, a peer-to-peer wireless protocol, a short-range wireless protocol, and/or other suitable wireless communication protocols. For ease of reading (and not limitation) purposes, the one or more communication interfaces 125 may be referred to herein using the singular tense.

In some embodiments, the MAT system 100 may include one or more user interfaces 128. The user interface(s) 128 may be utilized to present or display indications of successful or failed authentications, and may be utilized by people to administer and manage their person MAT signatures, if desired. The one or more user interfaces 128 may include one or more suitable types of user input devices, such as keyboards, touch screen displays, microphones, and/or any suitable types of remote and/or local user input devices. Additionally, the one or more user interfaces 128 may include one or suitable types of output devices, such as touch screen displays, speakers, mice, touch pads, and the like. The user interfaces 128 may include one or more local user interfaces, and/or may include one or more remote user interfaces that are communicatively connected to the system 100 via the network 105 (e.g., user interfaces which are provided by an application, web browser, or other software executing on a PED of a person or on a remote computing device). For ease of reading (and not limitation) purposes, the one or more user interfaces 128 may be referred to herein using the singular tense. Via the user interface 128, a person may approve, delete, register, de-register, etc. one or more of the MAT signatures corresponding to the person and stored in the registry 120. For example, via the user interface 128, the person may approve a MAT signature of a particular makeup look that is to be utilized for authentication at a particular event, thereby including the approved MAT signature in the registry 120, and after the event has been completed, the person may then de-register the MAT signature of the particular makeup look.

Of course, in some embodiments, the MAT system 100 may include other instructions 130 and/or other data 132 stored on the memory 110. For example, the other instructions 130 may be executable by processor 108 to perform various functions to support and/or related to the authentication of people based on makeup application techniques, and the other data 132 may include data that is read, stored, and/or otherwise utilized by the MAT footprint extractor 112, the MAT authenticator 115, the MAT signature generator 118, as well as other types of data. In some embodiments, the MAT system 100 may include additional and/or alternate components not shown in FIG. 1.

Further, it is understood that when the MAT system 100 is implemented as a distributed system, various components 108-118, 125-132 of the system 100 may be implemented in a distributed manner. For example, when the system 100 includes one or more servers and one or more PEDs, at least some of each of the components 108-118, 125-132 may be included in the one or more servers and at least some of each of the components 108-118, 125-132 may be included in the one or more PEDs.

Figure 2:
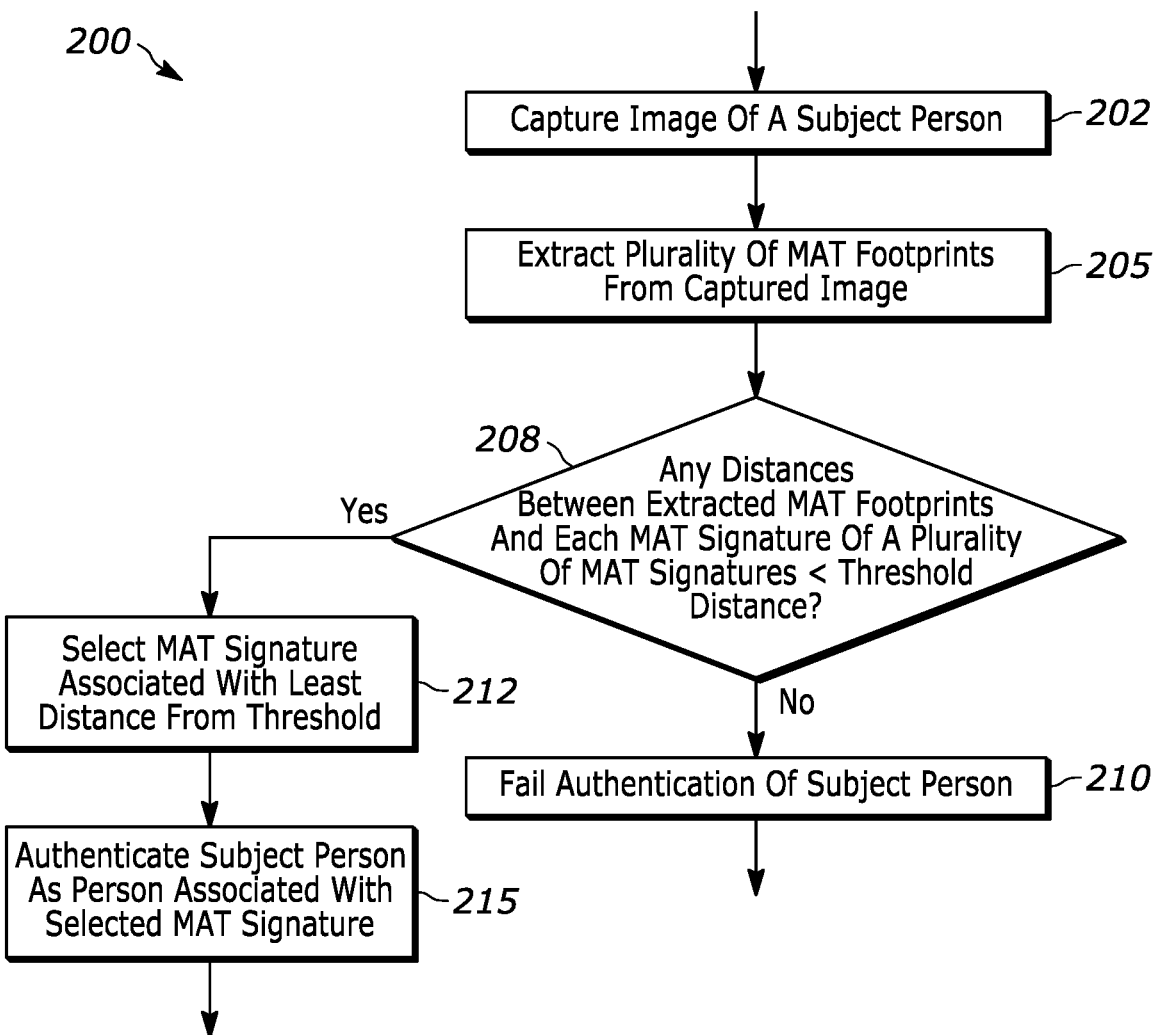
FIG. 2 depicts a flow diagram of an example method for authenticating a person based on makeup application techniques, which may be performed at least in part by the system of FIG. 1.

FIG. 2 depicts a flow diagram of an example method 200 for authenticating people based on makeup application techniques. For example, an instance of the method 200 may be executed when a person attempts to access a secured service (e.g., in an on-line, electronic, or virtual environment) and/or when a person attempts to access a physical location or environment. In an embodiment, at least a portion of the method 200 is performed by a MAT system, such as the MAT system 100. For example, the MAT footprint extractor 112 stored on the memories 110 of the system 100 may be executed by processors 108 to cause the system 100 to execute at least a portion of the method 200, and the MAT authenticator 115 stored on the memories 110 of the system 100 may be executed by processors 108 to cause the system 100 to execute at least a portion of the method 200. For ease of discussion herein (and not for limitation purposes), the method 200 is described with simultaneous reference to FIG. 1 including the MAT system 100 and the image-capturing device 102, although it is understood that any one or more portions of the method 200 may be utilized in systems other than the example system 100 and with one or more image-capturing devices other than device 102. Additionally, in some embodiments, at least a portion of the method 200 may operate in conjunction with at least a portion of the method 300 described elsewhere herein. Further, in some embodiments the method 200 may include additional or alternate blocks other than those depicted in FIG. 2.

At a block 202, the method 200 may include capturing, via an image capturing device, an image of a subject person. For example, a digital image of the subject person may be captured by the image capturing device 102. The captured image may be a static image or a dynamic image (such as a video), and/or the captured image may be a two-dimensional image or a three-dimensional image. The captured image may include a depiction of at least part of the subject person to which makeup has been applied, such as at least a portion of the subject person's face, chest, arm, and/or other body part.

At a block 205, the method 200 may include extracting a plurality of footprints from the captured image. Each footprint of the plurality of extracted footprints may be indicative of a respective technique via which make-up was applied to the person, e.g., as depicted within the captured image. That is, each footprint may be a footprint of a respective makeup application technique which was utilized to apply make up to the subject person, e.g., as depicted within the captured image.

As previously discussed, a makeup application technique, as utilized herein, may include a technique via which makeup can be applied to a person, e.g., how the makeup is applied and/or a pattern (temporal, spatial, etc.) in which the makeup is applied. As such, examples of makeup application techniques may include a utilization of a specific type of makeup tool (e.g., different types of brushes, sponges, swabs, pads, fingers, sprays, etc., and/or, in situations in which fingers are used as makeup tools, different techniques such as patting, rubbing, stroking, dabbing, blending, etc.); a utilization of a specific group of types of makeup tools; an order or sequence of application of a specific type of makeup product to multiple different areas of the face and/or body of a person; an order or sequence of application of different types of makeup products to the face and/or the body of a person; a respective directionality of application of one or more types of makeup products; respective regions of the face and/or body to which one or more types of makeup products are applied (which may be based on, for example, digital maps of respective regions of the person's face and/or body, where at least some of the regions may, in some cases, be defined or delineated on a per-pixel level), respective pressures of application of one or more types of makeup products; respective shading (e.g., degrees, regions, and/or directionalities of shading) of one or more types of makeup products; and/or other techniques and/or patterns via which makeup can be applied to a person, either singularly or in combination.

In some situations, in addition to how the makeup was applied, a makeup application technique may be further distinguished based on the content and/or substance of the physical makeup which has been applied. Examples of contents and/or substances of makeup may include a type or category of makeup product (e.g., foundation, eyeshadow, blush, lip gloss or lipstick, eyeliner, mascara, bronzer, etc., and/or less commonly used makeup materials such as glitter, temporary tattoos, body paint, etc.); a combination of types of makeup products/categories; a formulation of a makeup product (e.g., powder, cream, gel, liquid, water resistant, waterproof, hybrid of types, etc.); a combination of types/ categories and formulations of more than one makeup product; respective amounts of one or more makeup products which were utilized; a color or color family of a specific makeup product; a combination of colors and/or color families of two or more specific makeup products; a brand of makeup product; a combination of different brands of makeup products; a texture of a makeup product; a combination of textures of two or more makeup products (which may be applied on top of and/or next to/adjacent one another); a type of overall style of makeup; and/or other attributes of the content or substance of makeup products applied to a person, either alone or in combination with other contents and/or substances.

At any rate, extracting 205 the plurality of footprints of makeup application techniques from the captured image may be performed by utilizing one or more image processing and/or computer vision techniques to detect each makeup application technique that was utilized to apply makeup to the person as depicted within the captured image. For example, extracting 205 the plurality of footprints may include utilizing edge detection, corner detection, image and/or object segmentation, object detection, artifact removal, color segmentation, texture analysis, linear analysis, linear filtering, convolution, independent component analysis, pattern recognition, and/or one or more other types of feature extraction algorithms. In some embodiments, at least some of the image processing techniques may be performed on a per-pixel basis so that each pixel of the captured image in which applied makeup is depicted may be analyzed, e.g., either alone or in combination with the analysis of other pixels, to thereby detect the usage of a particular makeup application technique. In some embodiments, at least some of the image processing techniques may apply Convolutional Neural Networks (CNNs) to patches or windows of the captured image, e.g., to thereby detect the usage of a particular makeup application technique. Other image processing techniques such as dimensionality reduction, feature selection, supervised learning, semi-supervised learning, deep learning, anomaly detection, ensemble methods, reinforcement learning, graph-based methods, and/or temporal analysis, to name a few, may be utilized to detect the usage of a particular makeup application technique depicted within the captured image. Indeed, in some embodiments, one or more artificial intelligence (AI), machine learning (ML), and/or computer or machine vision techniques may be utilized in extracting 205 the plurality of MAT footprints from the captured image. For example, the extracting 205 of the plurality of MAT footprints from the captured image may include applying one or more trained ML models to the captured image of the subject person to extract one or more features from the captured image. Techniques for training and re-training the one or more ML models are discussed in more detail elsewhere herein.

At a block 208, the method 200 may include determining whether a respective distance between the plurality of extracted footprints (e.g., collectively, or when viewed as a whole) and each makeup application technique (MAT) signature of a plurality of makeup application technique signatures is less than a threshold distance. For example, the block 208 may include determining a respective distance between the plurality of extracted footprints (e.g., collectively, or when viewed as a whole) and each MAT signature stored in the MAT signature registry 120. The threshold distance may be predetermined or pre-defined, and the threshold distance may be tuned or otherwise modified to change the sensitivity of the authentication, e.g., by an administrator of the authentication process via the user interface 128. Further, in some embodiments, the system 100 may store, in memories 110, multiple different thresholds, each of which may be designated to be utilized for authorizations at different, associated physical or virtual locations.

When none of the respective distances is less than the threshold distance (e.g., as denoted by the "No" leg of the block 208), the method 200 may include indicating 210, via at least one of a display or a communication interface, that an authentication of the person depicted in the captured image failed.

On the other hand, when one or more of the respective distances is less than the threshold distance (e.g., as denoted by the "Yes" leg of the block 208, the method 200 may include selecting 212 a MAT signature corresponding to a least distance among the one or more respective distances and authenticating 215 the person captured in the image as the respective person corresponding to the selected MAT signature. In embodiments (not shown), the method 200 may include indicating, e.g., via at least one of a display or a communication interface, that the person captured in the image is successfully authenticated as the respective person corresponding to the MAT signature.

In some embodiments of the method 200 (not shown), the authentication of the person based on makeup application techniques is a first authentication factor, and the method 200 may further comprise utilizing one or more other authentication factors in combination with the first authentication factor to fully, entirely, or completely authenticate the person. That is, authenticating people based on makeup application techniques may be utilized as one of multiple authentication factors. The other one of more authentication factors may include, for example, a password, a personal identification number, facial recognition, recognition of another biometric characteristic (e.g., such as iris or fingerprint authentication), a prompt sent to another device or another application, and/or another type of authentication factor. After each factor of the multi-factor authentication has been successful in authenticating the subject person, the subject person may be considered to be completely authenticated and thereby granted access, e.g., to the corresponding secured device, application, service, area, physical location or space, virtual location or space, etc.

In some embodiments of the method 200 (not shown), a first instance of the method 200 may be executed and the subject person captured in the image is authenticated as the respective person corresponding to the selected MAT signature based on the execution of the first instance. The method 200 may further include executing one or more additional instances of the method 200 over time (e.g., periodically, on demand, etc.), thereby providing continual authentication of the subject person. For example, the method 200 may be applied to various frames of a streaming video in which the subject person is depicted. The multiple instances of execution of the method 200 may be performed during a single session, over a finite time interval, etc.

In some embodiments (not shown), the method 200 may include updating the MAT signature associated with the subject person that is stored within the MAT registry 120 based on the plurality of MAT footprints which were extracted 205 from the captured image during the execution of an instance of the method 200. That is, as a MAT signature is indicative of a collective set of makeup application techniques that are typically utilized by a respective person, the MAT signature may have been based on and/or generated from multiple instances of sets of makeup application techniques utilized by the respective person, e.g., such as by utilizing manners discussed elsewhere within this disclosure. Accordingly, the MAT footprints 205 extracted during the execution of an instance of the method 200 may be considered as an additional instance of the respective person utilizing a set of makeup application techniques. As such, the extracted footprints 205 may be utilized to update the selected MAT signature and the updated MAT signature may be stored in the MAT registry 120 at the data store 122, e.g., in manners discussed elsewhere within this disclosure. Updating the MAT signature associated with the respective person may be performed by at least portions of the method 300 discussed elsewhere in this disclosure, for example. After updating the MAT signature that is associated with the subject person and that is stored in the MAT registry 120, at some later time, another instance of the method 200 may be executed to authenticate the subject person based on the updated, associated MAT signature stored in the registry 120.

Figure 3:
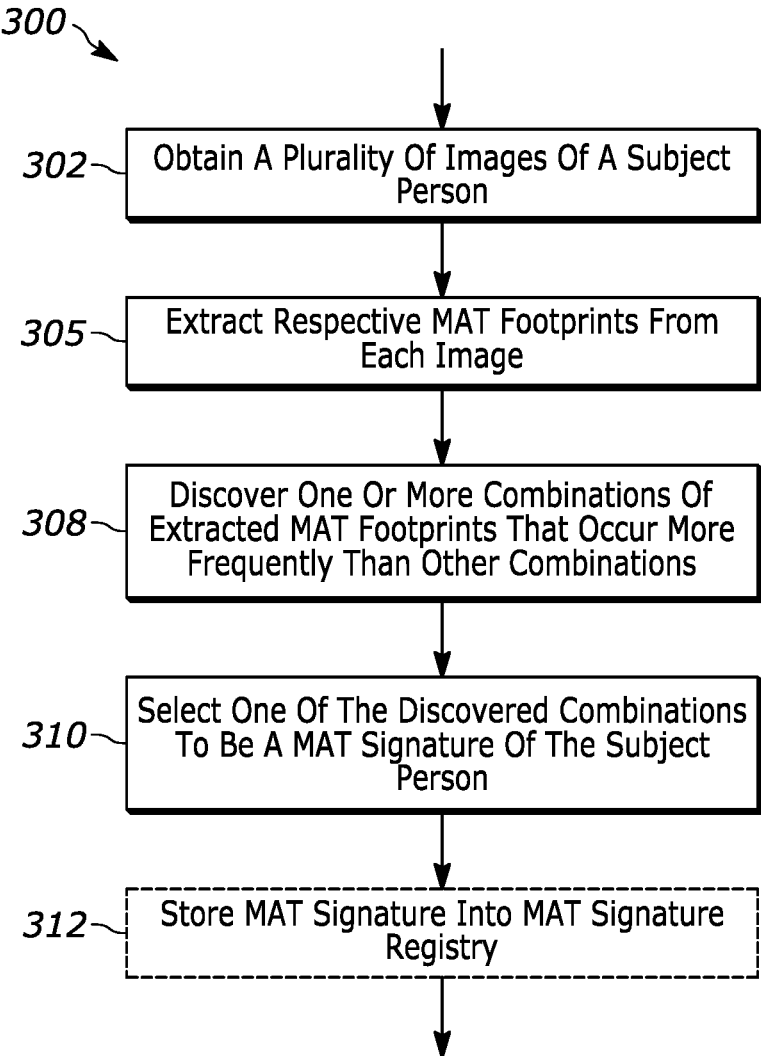
FIG. 3 depicts a flow diagram of an example method for generating a makeup application technique signature of a person, which may be performed at least in part by the system of FIG. 1.

FIG. 3 depicts a flow diagram of an example method 300 for generating a makeup application technique signature of a person. At least a portion of the method 300 may be performed by the MAT system 100 of FIG. 1, and/or by another system. For example, the MAT signature generator 118 stored on the memories 110 of the system may be executed by processor 108 to cause the system 100 to execute at least a portion of the method 300. For ease of discussion herein (and not for limitation purposes), the method 300 is described with simultaneous reference to FIG. 1 including the MAT system 100 and the image-capturing device 102, although it is understood that any one or more portions of the method 300 may be utilized in systems other than the example system 100 and with one or more image-capturing devices other than device 102. Additionally, in some embodiments, at least a portion of the method 300 may operate in conjunction with at least a portion of the method 200 described elsewhere herein. For example, an instance of the method 300 may be executed prior to executing an instance of the method 200. Further, in some embodiments the method 300 may include additional or alternate blocks other than those depicted in FIG. 3.

At a block 302, the method 300 may include obtaining a plurality of images of a subject person. The plurality of images may include digital images, static images, dynamic images (such as video images), two-dimensional images, and/or three-dimensional images. At least some of the plurality of images may be obtained 302 in-line with the execution of the method 300, e.g., via image-capturing device 102, and at least some of the plurality of images may be obtained from a data store. For example, a set of training images 135 may be obtained 302 from the data store 102, where each training image depicts at least a portion of the subject person to which makeup has been applied. In some implementations, the set of training images 135 may also include a plurality of images of other people to which makeup has been applied. Some of the obtained images may include or be associated with respective labels, metadata, and/or other types of descriptions which are indicative of makeup application techniques that have been utilized to apply the makeup depicted on the respective people who are depicted within the obtained images. Additionally or alternatively, some of the obtained images may include or be associated with respective labels, metadata, and/or other types of descriptions which are indicative of a type of name of a makeup look (e.g., an everyday makeup look, a summer makeup look, a winter makeup look, a formal makeup look, an on-camera makeup look, etc.) which is depicted on the respective people depicted within the obtained images. Still additionally or alternatively, some of the obtained images may include or be associated with respective labels, metadata, and/or other types of descriptions which are indicative of the identities of the respective people depicted within the obtained images. However, any or all of these types of descriptive indications are not necessary. For example, some pluralities of obtained images 302 may not include any descriptive indications of any makeup application techniques that have been utilized to apply the makeup depicted on the people depicted within the obtained images, and/or may not include any descriptive indications of respective makeup looks depicted within the obtained images.

At a block 305, the method 300 may include extracting respective makeup application technique (MAT) footprints from each of the obtained images, where each footprint generally distinguishes a corresponding makeup application technique from other makeup application techniques. Extracting 305 respective MAT footprints from each obtained image may be performed in a manner similar to that described above for the block 205. For example, one or more image processing and/or computer vision techniques may be applied to each image of the plurality of training images 135 to discover, determine, identify, or extract the one or more specific makeup application technique footprints or features that distinguish one makeup application technique from other makeup application techniques. The extracted footprints or features may be stored in the data store 122, for example (not shown). In some embodiments, at least some of the extracted footprints may be stored in conjunction with an indication of a respective person from whose image (within the set of training images 135) the footprint was extracted. In some implementations, the MAT signature generator 118 may request or invoke the MAT footprint extractor 112 to extract MAT footprints from each of the obtained images.

At a block 308, the method 300 may include discovering one or more combinations of extracted MAT footprints, where each discovered combination, as a whole or as a set, occurs more frequently among the obtained plurality of images than (a majority of) the other combinations of extracted MAT footprints. Each discovered combination of extracted MAT footprints may be specific, particular, or in some cases unique to subject person. In a sense, each discovered combination of extracted MAT footprints may be viewed as a candidate MAT signature for the subject person. Candidate MAT signatures may be discovered by utilizing, for example, pattern recognition, clustering, cluster analysis, optimization techniques, class discovery, and/or other discovery techniques, which typically, but not necessarily, are unsupervised discovery techniques. Each discovered combination or candidate MAT signature need not include a same number of extracted MAT footprints. That is a first discovered combination/candidate MAT signature may include more extracted footprints than a second discovered combination/candidate MAT signature.

At a block 310, the method 300 may include selecting one of the discovered combinations to be a MAT signature of the subject person, thereby generating a new MAT signature of the subject person. The selection may be based on, for example, a clustering threshold which may be predetermined or pre-defined, and the clustering threshold may be tuned or otherwise modified to change the specificity of MAT signatures. In some situations, multiple discovered combinations may be selected as multiple MAT signatures of the subject person. For example, a first selection may correspond to a first makeup look that is utilized by the subject person, and a second selection may correspond to second, different makeup look that is utilized by the subject person.

At an optional block 312, the method 300 may include storing the newly generated MAT signature(s) of the subject person in a data store. For example, the newly generated MAT signature(s) may be added to the MAT signature registry 120, or otherwise stored in the data store 122. The newly generated MAT signature(s) may be used in subsequent authentications of the subject person, e.g., as per the method 200.

In embodiments, at least portions of the method 300 may be utilized to train one or more artificial intelligence (AI) or machine learning (ML) models which may then be utilized to authenticate people based on makeup application techniques. For example, one or more ML models which have been trained by utilizing at least a portion of the method 300 may be stored in the data store 122 and utilized by the MAT authenticator 115. For instance, the method 200 may authenticate a person whose image has been captured based on makeup application techniques by utilizing one or more ML models which have been trained by utilizing at least a portion of the method 300 and that are stored in the data store 122.

In these embodiments, training the one or more ML models for use by the methods and systems described herein may include utilizing at least blocks 302, 305, and 308 of method 300. In particular, the training of the one or more ML models may include obtaining 302 a dataset of a plurality of training images 135 depicting therein multiple people to which makeup has been applied. The dataset of training images may include digital images, static images, dynamic images (such as video images), two-dimensional images, and/or three-dimensional images, and may also include indications of the respective people who are depicted in each training image. The data set of training images may optionally include respective labels, metadata, and/or other types of descriptions which are indicative of makeup application techniques and/or makeup looks, in some implementations. Further, the training of the one or more ML models may additionally include extracting 305 various MAT footprints from the obtained dataset of training images, where each footprint generally distinguishes a corresponding makeup application technique from other makeup application techniques.

Still further, in these embodiments, the training of the one or more ML models may include recognizing, discovering, identifying, or otherwise determining 308 one or more patterns of extracted MAT footprints (e.g., footprints of various procedures, sequential steps, and/or products, such as previously discussed) that are specific, particular, or unique to the various ways in which the different people depicted within the training images 135 apply makeup. That is, the recognized or discovered patterns may differentiate each particular person who is depicted within the dataset of training images 135 from other people who are depicted within the dataset of training images 135, e.g., by utilizing one or more pattern recognition techniques. For example, block 308 may include utilizing one or more convolutional neural networks (CNNs) to identify different patterns of makeup application techniques that differentiate different individuals depicted within the set of training images 135, and each differentiating pattern may include a respective plurality of MAT techniques (e.g., a respective plurality of extracted features). Further, in some implementations, the recognizing or discovering 308 patterns of makeup application techniques which distinguish between people may include recognizing or discovering patterns of makeup application techniques for different makeup looks, e.g., formal, casual, and/or other event-based makeup looks, seasonal makeup looks, location-based makeup looks (e.g., work, school, weekend, vacation), time of day, etc.

Said another way, the training of the one or more ML models may include discovering 308 one or more MAT signatures of at least some of the people depicted within the dataset of training images 135. The discovered MAT signatures may be stored in the data store 122, e.g., in the MAT signature registry 120, and the trained one or more ML models may also be stored in the data store 122 (not shown in FIG. 1). As such, the trained one or more ML models may be applied to an input image in which a subject person is depicted (or alternatively, may be applied to a set of features or MAT footprints which have been extracted from the input image) for authentication purposes, and a corresponding output of the trained one or more ML models may be indicative of one or more candidate people whose respective MAT signatures are stored in the data store 122. Optionally, the corresponding output of the trained one or more ML models may also include associated levels of confidence for each of the candidate people.

In an example utilization, during the execution of an instance of the method 200, the trained one or more ML models may be utilized to execute the block 208 and thus may be applied to the image that was captured 202 during the instance of the method 200. In another example utilization, during the execution of an instance of the method 200, the trained one or more ML models may be utilized to collectively execute the blocks 208-210 and thus may be applied to the image that was captured 202 during the instance of the method 200. Further, in some scenarios, the image that was captured 202 during the execution of the instance of the method 200 and optionally any MAT footprints that were extracted 205 from the captured image may be added to the dataset of training images 135, thereby updating the training dataset. Subsequently, the trained one or more ML models may be retrained using the updated dataset of training images, and the re-trained one or more ML models may be utilized in subsequent or future authentications of people, such as subsequent or future execution of other instances of the method 200.

In embodiments, at least portions of the method 300 may be utilized to update a MAT signature of the subject person which is (already) stored in the data store 122. In an example, an additional image of the subject person may be obtained and added to the training images 135 of the subject person, and the blocks 305-310 of the method 300 may be executed to update at least one of the MAT signatures of the subject person based on the updated training images. For example, the obtained image may be the image captured 202 by the image capturing device 102 during an execution of the method 200. The updated MAT signature(s) may be added to the MAT signature registry 120 for use in subsequent authentications of the subject person, e.g., by the method 200. In another example, during an authentication process for the subject person based on makeup application techniques (e.g., as per the method 200), upon extracting 205 the plurality of MAT footprints from a captured image of the subject person, the extracted MAT footprints of the captured image may be added to the set of extracted MAT footprints of the training images 135. The updated set of extracted MAT footprints may be utilized to discover one or more updated MAT signatures of the subject person, e.g., as per blocks 308, 310. The updated MAT signature(s) may be added to the MAT signature registry 120 for use in subsequent authentications of the subject person, e.g., per the method 200.

In some situations (not shown), a makeup application technique signature of a subject person may be generated based on a bounded or constrained set of training images. For example, when a movie actor is to be authenticated at a promotional event based on a makeup look that was applied to the actor in the movie, the MAT signature for the movie actor for the promotional event may be generated based on only obtained 302 still and/or video images of the actor provided by the movie company and in which the actor is depicted in movie makeup.

The novel methods, systems, and techniques for authenticating people based on makeup application techniques described herein provide multiple advantages over known authentication techniques. For example, one or more makeup application technique signatures can be uniquely customized for a particular person, thereby allowing for a wide range of distinct combination or patterns of MAT footprints that can thus provide a high level of security which is also flexibly applicable to different situations and environments. Additionally, at least due to the complexity and uniqueness of makeup patterns of MAT signatures, the difficulty of forging or spoofing a user's makeup pattern to gain unauthorized access is greatly reduced over known authorization techniques, particularly when makeup application techniques are combined with other authentication factors (such as biometric recognition) for increased or enhanced security. Further, the MAT-based authentication techniques described herein preserve a user's privacy, as a MAT signature can be easily removed or dynamically modified by the user (and in some cases for only a limited duration of time, a specific location, and/or other criteria), which advantageously provides an additional level of privacy compared to other biometric-based authentication methods that rely on permanent or semi-permanent physical features. Additionally, the MAT-based authentication techniques described herein are adaptable and versatile, as the techniques can be easily integrated into various applications, such as mobile devices, online services, access control systems, event ticketing, identify verification, and/or other systems requiring user identification, and can be combined with other authentication factors for enhanced security. Additionally, MAT-based authentication techniques are easy to use and do not require any additional hardware or complex setup procedures for a user.

This detailed description is to be construed as exemplary only and does not describe every possible embodiment, as describing every possible embodiment would be impractical, if not impossible. One may implement numerous alternate embodiments, using either current technology or technology developed after the filing date of this application.

Although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a business or home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

Further, upon reading this disclosure, those of skill in the art will appreciate still additional alternative structural and functional designs for a robotic cosmetic application device, and/or systems, methods, and/or techniques associated therewith. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method of verifying an identity of a person based on a makeup application technique signature, the method comprising:

capturing, by one or more computing devices and by utilizing an image capturing device, an image of the person;

applying one or more image processing and/or computer vision techniques to the captured image, thereby distinguishing a set of makeup application techniques (MATs) via which make-up was applied to the person depicted in the captured image, the distinguished set of MATs including at least one of a directionality of application, a pressure pattern, a region of application, a color distribution, or a shading pattern;

providing a plurality of makeup application technique (MAT) signatures, each MAT signature of the plurality of MAT signatures corresponding to a respective person and indicative of a respective combination of techniques via which the respective person applies makeup to themselves, and each MAT signature approved by the respective person;

determining, by the one or more computing devices, whether a respective distance between the distinguished set of MATs corresponding to the person depicted in the captured image and each MAT signature of the plurality of MAT signatures is less than a threshold distance;

when none of the respective distances is less than the threshold distance, indicating, by the one or more computing devices and via at least one of a display or a communication interface, that a match was not found between the distinguished set of MATs corresponding to the person depicted in the captured image and any of the plurality of MAT signatures; and when one or more of the respective distances is less than the threshold distance:

selecting, by the one or more computing devices, a MAT signature corresponding to a least distance among the one or more respective distances;

indicating, via at least one of the display or the communication interface, a match between the distinguished set of MATs corresponding to the person depicted in the captured image and the selected MAT signature, the indicating of the match utilized as a first authentication factor; and utilizing another authentication factor in combination with the first authentication factor to authenticate the person depicted in the captured image, the another authentication factor including at least one of a password, a personal identification number, facial recognition, another biometric characteristic, or a prompt sent to another device.

2. The method of claim 1, wherein the respective combination of techniques via which the respective person applies makeup includes at least one of:

a utilization of a particular set of makeup tools;

an order of application of a particular makeup product to multiple areas of the person;

an order of application of different makeup products;

respective directionalities of application of one or more makeup products; or respective pressures of application of the one or more makeup products.

3. The method of claim 2, wherein the respective combination of techniques via which the respective person applies makeup further includes at least one of:

a type of makeup product;

a formulation of the type of makeup product;

a combination of types of makeup products;

a combination of types and formulations of more than one makeup product;

respective amounts utilized of the one or more makeup products;

respective shapes of application of the one or more makeup products;

a color of a specific makeup product;

a combination of colors of two or more specific makeup products; or one or more regions of a face of the respective person to which makeup is applied.

4. The method of claim 1, wherein the one or more image processing and/or computer vision techniques include at least one of: edge detecting, color segmenting, or utilizing another type of feature extraction algorithm.

5. The method of claim 1, wherein capturing the image of the person includes capturing an image of a portion of the person other than a face of the person and to which makeup has been applied.

6. The method of claim 1, wherein the another authentication factor is the facial recognition or the another biometric characteristic.

7. The method of claim 1, wherein:

a first instance of the method is executed during a session and the person depicted in the captured image is identified as being the respective person corresponding to the selected MAT signature based on the execution of the first instance; and the method further comprises subsequently executing additional instances of the method during the session to thereby providing continual verification of the identity of the person during the session.

8. The method of claim 1, further comprising updating the selected MAT signature based on the distinguished set of MATs.

9. The method of claim 1, further comprising modifying or deleting, based on an instruction provided by the person, one or more MAT signatures that are included in the plurality of MAT signatures and that correspond to the person.

10. The method of claim 1, wherein the plurality of MAT signatures includes one or more MAT signatures of the person, and the method further comprises generating at least one of the one or more MAT signatures of the person by image processing multiple images of the person.

11. The method of claim 10, wherein generating the at least one of the one or more MAT signatures of the person includes discovering the at least one of the one or more MAT signatures of the person by applying one or more unsupervised discovery techniques to data generated from the image processing of the multiple images of the person.

12. A system for verifying an identity of a person based on a makeup application technique signature, the system comprising:

one or more processors;

a plurality of makeup application technique (MAT) signatures stored in one or more data stores of the system, each makeup application technique signature of the plurality makeup application technique signatures corresponding to a respective person and indicative of a respective combination of techniques via which the respective person applies makeup to themselves, wherein each MAT signature is approved by the respective person; and one or more non-transitory computer-readable media coupled to the one or more processors and storing instructions thereon that, when executed by the one or more processors, cause the system to:

capture, via an image capturing device, an image of the person;

apply one or more image processing and/or computer vision techniques to the captured image to thereby distinguish a set of makeup application techniques (MATs) via which make-up was applied to the person depicted in the captured image, the distinguished set of MATs including at least one of a directionality of application, a pressure pattern, a region of application, a color distribution, or a shading pattern;

determine whether a respective distance between the distinguished set of MATs corresponding to the person depicted in the captured image and each MAT signature of the plurality of MAT signatures is less than a threshold distance;

when none of the respective distances is less than the threshold distance, indicate, via least one of a display or a communication interface, that a match was not found between the distinguished set of MATs corresponding to the person depicted in the captured image and any of the plurality of MAT signatures; and when one or more of the respective distances is less than the threshold distance:

select a MAT signature corresponding to a least distance among the one or more respective distances:

indicate, via at least one of the display or the communication interface, a match between the distinguished set of MATs corresponding to the person depicted in the captured image and the selected MAT signature, the indication of the match utilized as a first authentication factor; and utilize another authentication factor in combination with the first authentication factor to authenticate the person depicted in the captured image, the another authentication factor including at least one of a password, a personal identification number, facial recognition, another biometric characteristic, or a prompt sent to another device.

13. The system of claim 12, wherein the respective combination of techniques via which the respective person applies makeup includes at least one of:

a utilization of a particular set of makeup tools;

an order of application of a particular makeup product to multiple areas of the person;

an order of application of different makeup products;

respective directionalities of application of one or more makeup products; or respective pressures of application of the one or more makeup products.

14. The system of claim 13, wherein the respective combination of techniques via which the respective person applies makeup further includes at least one of:

a type of makeup product;

a formulation of the type of makeup product;

a combination of types of makeup products;

a combination of types and formulations of more than one makeup product;

respective amounts utilized of the one or more makeup products;

respective shapes of application of the one or more makeup products;

a color of a specific makeup product;

a combination of colors of two or more specific makeup products; or one or more regions of a face of the respective person to which makeup is applied.

15. The system of claim 12, wherein the plurality of MAT signatures includes more than one signature corresponding to the person.

16. The system of claim 12, wherein the one or more image processing and/or computer vision techniques include at least one of: edge detection, color segmentation, or another type of feature extraction algorithm.

17. The system of claim 12, wherein the plurality of MAT signatures includes one or more MAT signatures of the person, and the instructions, when executed by the one or more processors, cause the system further to generate at least one of the one or more MAT signatures of the person by image processing multiple images of the person.

18. The system of claim 17, wherein the generation of the at least one of the one or more MAT signatures of the person includes a discovery, via one or more unsupervised discovery techniques applied to data generated by the image processing of the multiple images of the person, of the at least one of the one or more MAT signatures of the person.

\* \* \* \* \*